United States Patent [19]

Buck

[11] 4,047,723
[45] Sept. 13, 1977

[54] COUNTERBALANCED CHUCK

[75] Inventor: James R. Buck, Prairieville Township, Berry County, shall Islands

[73] Assignee: Buck Tool Company, Kalamazoo, Mich.

[21] Appl. No.: 651,949

[22] Filed: Jan. 23, 1976

[51] Int. Cl.$^2$ .................. B23B 31/16; B23B 31/14
[52] U.S. Cl. .................................. 279/121; 279/1 C; 279/119
[58] Field of Search .................. 279/1 R, 1 C, 1 ME, 279/123

[56] References Cited

U.S. PATENT DOCUMENTS

| 2,703,242 | 3/1955 | Sloan et al. | 279/1 ME |
| 2,729,459 | 1/1956 | Leifer | 279/1 C |
| 2,784,977 | 3/1957 | Dinsmore | 279/1 C |
| 2,828,134 | 3/1958 | Buck et al. | 279/1 C |
| 3,984,114 | 10/1976 | Ovarin | 279/1 C X |

FOREIGN PATENT DOCUMENTS 2,236,651  2/1974  Germany .................. 279/1 C

Primary Examiner—Francis S. Husar
Assistant Examiner—William R. Briggs
Attorney, Agent, or Firm—Blanchard, Flynn, Thiel, Boutell & Tanis

[57] ABSTRACT

Counterbalanced mechanism for a jaw chuck. There is provided for an otherwise conventional multi-jaw chuck suitable mechanism for independently balancing each said jaw. In a preferred embodiment, a pin is pivotally fixed at one of its ends into each master jaw, pivoted to the chuck body intermediate its ends and pivotally related at its other end to a radially movable counterbalancing mass. Each said mass and jaw are so related to the lever pin upon which they operate that they create balancing moments when the centrifugal force acting on each is equal and, due to the geometry of the apparatus, said moments remain sufficiently close to equal at any speed of operation of the chuck that a substantial balancing of the parts is obtained. Thus, whether the chuck is inside gripping or outside gripping, it can be properly adjusted in a normal manner at a standstill and the pressure of the chuck onto the workpiece will not materially change within the range of any normal operating speed.

8 Claims, 2 Drawing Figures

COUNTERBALANCED CHUCK

FIELD OF THE INVENTION

The invention relates to jaw chucks and particularly to an otherwise substantially conventional jaw chuck which is effectively counterbalanced in such a manner that the pressure of the chuck jaws onto the workpiece will remain substantially constant even though the rotative speed of the chuck changes through a normal range of operating speeds.

BACKGROUND OF THE INVENTION

It has long been recognized that in any jaw chuck arrangement operating at other than relatively low rotative speeds, the centrifugal force developed on the chuck jaws as rotative speeds increase may cause an appreciable change in the force by which the jaws engage the workpiece. Accordingly, where the jaws are arranged for inside gripping, an increase in rotative speed will increase the centrifugal force applied by the jaws to the workpiece and may effect a substantial distortion of the workpiece. This, particularly with relatively thin workpieces, often requires that the operating speed of the chuck be kept much below the speed at which cutting could otherwise be carried out with a resulting increase in the time required for a given operation and consequent greater expense. Conversely, where the chuck is arranged for outside gripping, centrifugal force will tend to diminish the force by which the chuck grips the workpiece, even to such a point that if the workpiece is subjected to substantial cutting pressure, it may slip in the chuck. This, again, often requires the operating speed of the chuck to be held below what would otherwise be possible.

This problem has long been known and several types of counterbalance chucks have in the past been offered. These, however, have usually been either relatively complex, requiring parts having close dimensional tolerances, and requiring precisely constructed means for evenly applying a counterbalancing force onto each jaw. These chucks have been truly effective for only a narrow range of speeds and tend at other speeds to distort the workpiece to an undesirable extent. They also have other disadvantages well known to the trade.

Accordingly, the objects of the invention include:

1. To provide a counterbalanced chuck as above set forth wherein the counterbalancing means is effective in a substantially constant manner at all normal operating speeds of a given chuck, whereby the force by which the chuck engages the workpiece will remain substantially constant throughout the entire range of normal operating speeds for such given chuck.

2. To provide a device, as aforesaid, which will constitute only a simple alteration in a wide range of otherwise standard chucks.

3. To provide apparatus, as aforesaid, which is simple and may be added to a wide range of otherwise standard chuck designs with only simple and inexpensive modifications thereof.

4. To provide apparatus, as aforesaid, wherein the changes required from otherwise standard chuck designs may be applied without adversely affecting the operation of the chuck.

Other objects and purposes of the invention will become apparent to persons acquainted with apparatus of this general type upon reading the following specification and inspection of the accompanying drawings.

SUMMARY OF THE INVENTION

The invention contemplates the provision for each jaw of the jaw chuck of a pin pivotally suspended onto the chuck body at a point intermediate the ends of such pin and having one end thereof pivotally connected to a radially movable jaw of the chuck and the other end of the pin pivotally connected to a radially movable counterweight. The relative masses of the jaw and counterweight are proportioned to the relative lever arms upon which they operate with respect to the pivotal support of said pin that same are in substantial balance regardless of the rate of rotation of the chuck throughout normal ranges of operating speeds. It is recognized that as a chuck jaw moves in one radial direction and the counterweight moves in the opposite radial direction the relative radii will change slightly and thereby somewhat change the centrifugal force acting upon the chuck jaw and counterweight, but these changes are sufficiently minor within the range of normal changes in operating speed that same can be tolerated and not interfere appreciably with the effective operation of the apparatus.

DETAILED DESCRIPTION

Figure 1:
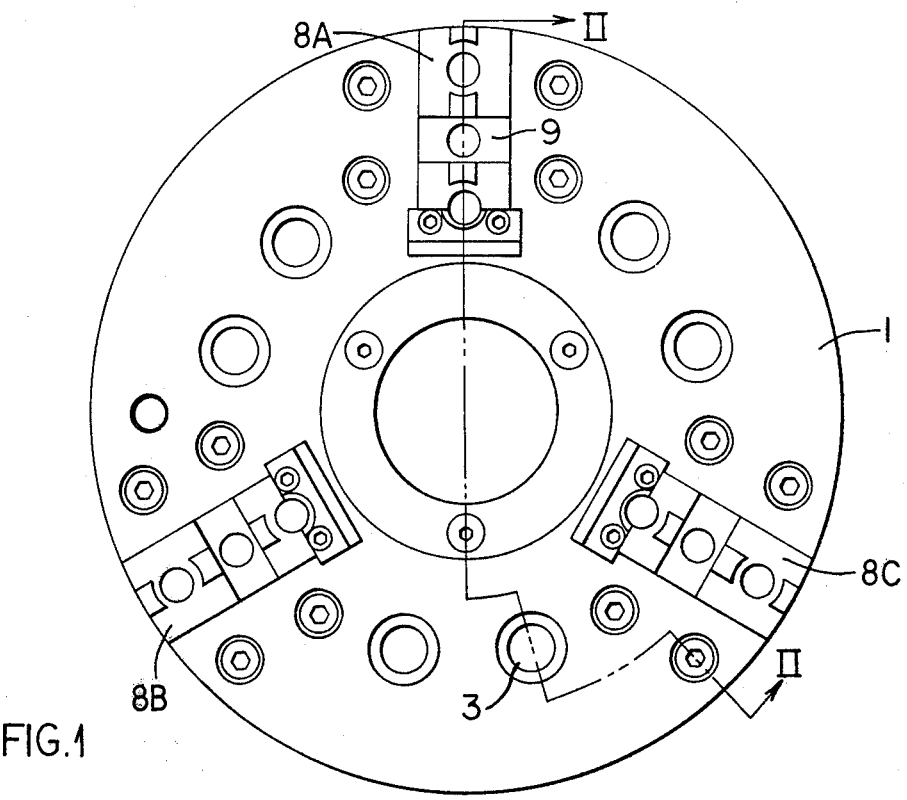
FIG. 1 is a front face view of an otherwise standard chuck incorporating the invention.
Figure 2:
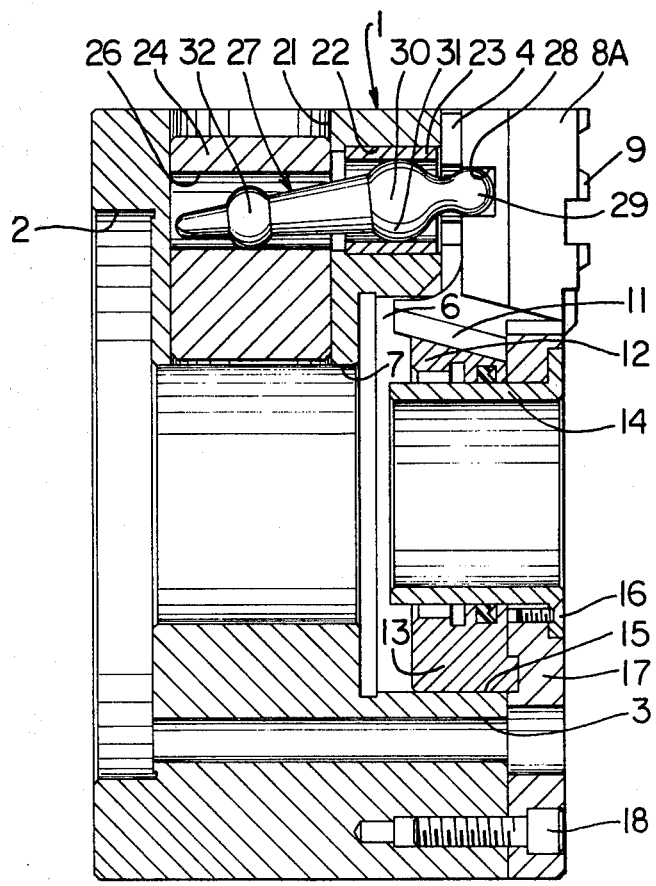
FIG. 2 is a section taken on the line II—II of FIG. 1.

Referring now to the drawings in more detail, there appears in FIG. 1 a front elevational view of a chuck which insofar as this view is concerned may be any of several standard constructions, such as that of the chuck shown in U. S. Pat. No. 3 252 710. For convenience in understanding of the present invention, such chuck will be briefly described herein and reference made to said patent for such further details as may be desired.

Referring therefore to the drawings, there is provided a generally cylindrical chuck body 1 having a rearward opening 2 for the reception thereinto of a conventional mounting flange, same being fixed to the chuck body as shown in the above-mentioned patent, by screws extending thereinto from the front of the chuck through a plurality of openings, of which one such appears at 3. A plurality, here three, of radially arranged slots 4 communicate into a central opening 6 which in this embodiment is connected to the recess 2 by a further central opening 7. A plurality of master jaws 8A, 8B and 8C each bearing appropriate means, here indicated as teeth 9, for carrying conventional top jaws (not shown) are slidably arranged in said slots. Each of said master jaws 8 terminates in a suitably sloped wedge follower 11 which is in turn engaged by conventional wedge means 12 formed as part of a slider 13. Said slider 13 is supported, as is conventional, for axial movement on and by the cylindrical surface 15 of the usual internal opening in the chuck body and is in dust sealing contact with a dust sleeve 14. Said latter is fixed by any convenient means such as the screws 16 to the top plate 17 which is in turn fixed, as by the screws 18, to the chuck body 1. Said slider 13 may be axially operated in either direction in any convenient conventional manner, such as by a drawbar, not shown, extending through the opening 7 and fixed to said slider 13.

All of the foregoing is conventional, forms no part of the present invention as such and is given only to illustrate the environment in which the invention operates. Further, it is given only as an example of typical chuck to which the invention may be applied and it will be recognized that the invention may be applied to a variety of other specific chuck constructions provided only that same utilize radially movable jaws for engaging and disengaging a workpiece.

Turning now to the construction embodying the invention, and referring to the jaw 8A, there is provided a radially aligned opening 21, same being in this embodiment spaced from but in axial alignment with the one of the slots 4 occupied by jaw 8A. In this embodiment, though not necessarily, said opening 21 extends all of the way through to the central opening 7. A further opening 22 is provided for connecting the slot 4 with the opening 21. If desired, and preferably, a wear bushing 23 may be provided as a liner for the opening 22. A counterbalance weight 24 is positioned slidably in the opening 21 and is provided with an opening 26 therethrough which is axially parallel to the axis of the chuck. A lever 27 is received at one end into a suitable slot 28 in the bottom of the master jaw 8A and preferably is provided with a spherical knob 29 at said end for effecting contact at the same point on the wall of the opening 28 in any normal pivoted position of the said lever in order to provide a lever arm of substantially constant length from said contact point with the master jaw 8A to the pivot center of the lever 27. Similarly, said lever is provided with intermediate spherical knob 31 for contacting the wear bushing 23 and doing so at substantially constant points thereon by which the point of pivotal support of said lever likewise remains substantially constant regardless of the angle or position of said lever. Adjacent the other end of said lever there is provided a further spherical knob 32 engaging at least one wall of the opening 26 and again the shape of said knob is to effect contact at a substantially constant point on the walls of the opening 26 regardless of the angular position of said lever to insure that the lever arm from such point of contact to the center of pivoting of the lever remains substantially constant in all positions thereof. Identical levers and mounting and receiving means therefor are provided for each of the other master jaws 8B and 8C of the chuck in the same manner as above described.

OPERATION

Turning now to the operation of the apparatus, and assuming for the moment that the chuck was designed on the assumption of the lever 27 having a normal or base position parallel to the central axis of the chuck, it will be recognized that the moment generated by the mass of the master jaw 8A together with that of the top jaw carried thereby about the theoretical pivot center 30 may be caused by appropriate design to balance the corresponding moment of the counterweight 24 about the same theoretical pivot point. Further, assuming that same are in actual balance when the lever 27 is aligned parallel to the central axis of the chuck, such balance will remain effective regardless of the speed of rotation of the chuck. This balanced relationship can, of course, also be provided by appropriate design for any other desired base position of the lever 27.

As the master jaws are moved outwardly or inwardly from said base position, the radius upon which the parts revolve will change slightly and thereby inversely change the centrifugal force acting upon such radially movable parts. However, such movement is relatively slight within the normal range of rotative speeds experienced by chucks of this nature. Whatever unbalance is created by such radial adjustment is of minor nature and can be tolerated.

It will be observed that the construction required for providing the counterbalance of the invention can be readily incorporated into a standard chuck inasmuch as the openings 21 can be drilled from the outside of the chuck into the central opening 7 thereof. The opening 22 may be easily drilled through from the slot 4 and the slightly enlarged portion thereof receiving the bushing 23 may be similarly drilled. The slots 28 may be cut into the bottom of any standard master jaw in a simple manner and the parts are ready for assembly as shown. None thereof are required to be of other than normal tolerances and since each counterbalance acts independently of each other counterbalance-jaw system, it is not necessary that exact uniformity be maintained for all of said systems. Substantial uniformity, however, is, of course, desirable in order to avoid excessive unbalancing and consequent vibration of such chuck particularly when rotating at a high speed. The parts may also be readily replaced as they wear and the chuck thereby easily maintained at all times in good operating condition.

It will be recognized that the invention may be easily applied to a wide variety of specific chuck designs. Particularly, although three jaws are here shown, the invention is applicable to a chuck having any number of radially movable jaws and although it has been indicated above that the wedge 12 operates in response to a drawbar, it will be evident that same may also be operated hydraulically insofar as the present invention is concerned if desired.

While the lever 27 is shown as lying in a plane which is axial of the chuck structure, and it is one of the advantages of the invention that such an alignment of the lever may be obtained, it will be recognized that at least some of the broader aspects of the invention may also be obtained by a generally similar counterbalance arrangement positioned with said lever 27 arranged parallel with the face plate 17.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. In a jaw chuck having a plurality of radially movable jaws and guide slots positioned radially in a chuck body receiving and guiding said jaws, actuating means connected to said jaws effecting radial movement thereof for gripping a workpiece, and means counterbalancing at least a portion of the centrigual force generated in said jaws upon rotation of said chuck, comprising the improvement wherein said counterbalancing means is independent of said actuating means and includes;

weight openings in said chuck body positioned parallel to and spaced from said slots and so spaced in a direction parallel with the rotational axis of said chuck;
   a counterbalance weight movably guided within each said weight opening;
   a lever opening in said chuck body parallel to the rotational axis of said chuck and connecting each of said weight openings to a corresponding one of said slots; and a lever aligned generally parallel with the rotational axis of said chuck and positioned for pivoting within said lever opening, said lever being independent of said actuating means and having one end thereof pivotally connected to one of said jaws and the other end thereof pivotally connected to one of said counterbalance weights, said lever including an intermediate pivot portion pivotally supported by said chuck body, said pivot portion having a rounded exterior surface disposed in pivotal bearing engagement with said chuck body and defining the sole pivotal support between said lever and said chuck body, whereby upon rotation of said chuck the moment generated by centrifugal force acting upon said jaws will be at least partially counterbalanced by a corresponding centrifugal force generated by such rotation of said counterbalance weights.

2. A jaw chuck according to claim 1, wherein said jaw has an opening in the rear thereof for the reception thereinto of one end of said lever, and wherein the end of said lever received into said jaw opening is provided with a bulbous portion for minimizing friction between said lever and said jaw and for maintaining substantially constant the effective lever arm from said jaw to the pivot center of said lever.

3. A jaw chuck according to claim 1, wherein said counterbalance weight is provided with an opening therethrough which is substantially coaxial with said lever opening and into which said other end of said lever projects, and wherein said last-named end of said lever is provided with a bulbous portion for contacting the walls of said opening in said counterbalance weight whereby to minimize friction therebetween and to effect a substantially constant lever arm between said counterbalance weight and the center of pivoting of said lever.

4. A jaw chuck according to claim 1, wherein said lever opening is defined by a substantially cylindrical wall which extends between the respective slot and weight opening, and wherein said intermediate pivot portion is of an enlarged ball-like configuration which has said rounded exterior surface defined thereon, said ball-like configuration being positioned within the lever opening so that said lever is pivotally supported on said chuck body solely by the engagement between said rounded exterior surface and said cylindrical wall.

5. A jaw chuck according to claim 4, wherein said jaw has a recess in the rear thereof for the reception thereinto of one end of said lever, wherein said counterbalance weight is provided with a recess therein which is substantially aligned with said lever opening and into which said other end of said lever projects, and wherein the opposite ends of said lever are provided with ball-like portions which are received within the respective recesses and create solely a rolling contact between the walls of the respective recesses and the exterior rounded surface of the respective ball-like portion.

6. A jaw chuck according to claim 4, wherein said chuck body has a sleevelike wear member positioned within each of said lever openings, said wear member having an internal surface which defines said cylindrical wall.

7. In a jaw chuck having a chuck body with first guide slots formed therein and extending radially thereof, a plurality of chuck jaws positioned within said first slots and movable radially thereof, actuating means connected to said jaws effecting radial movement thereof for gripping a workpiece, and counterbalance means counterbalancing at least a portion of the centrifugal force generated in said jaw upon rotation of said chuck about its centerline, the improvement wherein said counterbalance means is independent of said actuating means and includes:

second guide slots formed in said chuck body, said second guide slots being spaced from said first guide slots and extending substantially radially of said chuck body;

a counterbalance weight movably guided within each of said second guide slots;

an elongated opening formed in said chuck body and connecting each of said second guide slots to a corresponding one of said first guide slots, said opening being at least in part defined by an annular wall; and a lever positioned within said opening and being pivotally supported on said chuck body, said lever being independent of said actuating means and having one end thereof pivotally connected to one of said jaws and the other end thereof pivotally connected to one of said counterbalance weights, said lever having an enlarged ball-like pivot portion disposed intermediate the ends thereof and defining a rounded exterior surface which is disposed in rockable contact with said wall, said lever being pivotally supported on said chuck body solely by the engagement between said exterior rounded surface and said wall, whereby upon rotation of said chuck the moment generated by centrifugal force acting upon said jaws will be at least partially counterbalanced by a corresponding centrifugal force generated by rotation of said counterbalance weights.

8. A jaw chuck according to claim 7, wherein the opposite ends of said lever are provided with ball-like knobs thereon wherein said counterbalance weight and said jaw each have an opening therein in which is received the ball-like knob formed on the respective end of said lever, each of said last-mentioned openings being defined by wall means which engages the exterior rounded surface defined by the respective ball-like knobs.

* * * * *